United States Patent
Heipp et al.

(10) Patent No.: US 7,638,760 B1
(45) Date of Patent: Dec. 29, 2009

(54) METHOD FOR TRACKING AND CORRECTING THE BASELINE OF A RADIATION DETECTOR

(75) Inventors: Christopher H. Heipp, Chagrin Falls, OH (US); David S. Vickers, Independence, OH (US)

(73) Assignee: GVI Technology Partners, Ltd., Twinsburg, OH (US)

( * ) Notice: Subject to any disclaimer, the term of this patent is extended or adjusted under 35 U.S.C. 154(b) by 0 days.

(21) Appl. No.: 11/140,337

(22) Filed: May 27, 2005

Related U.S. Application Data (60) Provisional application No. 60/575,163, filed on May 28, 2004, provisional application No. 60/575,683, filed on May 28, 2004.

(51) Int. Cl.
*G01T 1/161* (2006.01)
(52) U.S. Cl. ............... 250/252.1; 250/363.07
(58) Field of Classification Search ............... 250/252.1, 250/363.07
See application file for complete search history.

(56) References Cited

U.S. PATENT DOCUMENTS

| | | | |
|---|---|---|---|
| 4,151,416 A | 4/1979 | Richey et al. | |
| 4,223,221 A | 9/1980 | Gambini et al. | |
| 4,424,446 A | 1/1984 | Inbar et al. | |
| 4,882,494 A | 11/1989 | Rogers et al. | |
| 4,899,054 A | 2/1990 | Barfod | |
| 5,079,424 A | 1/1992 | Kobayashi | |
| 5,171,986 A | 12/1992 | Loomis et al. | |
| 5,237,173 A | 8/1993 | Stark et al. | |
| 5,412,215 A | 5/1995 | Shuto et al. | |
| 5,550,377 A | 8/1996 | Petrillo et al. | |
| 5,646,408 A * | 7/1997 | Goldberg et al. ....... | 250/363.07 |
| 5,677,536 A | 10/1997 | Vickers | |
| 5,684,850 A * | 11/1997 | Warburton et al. ............ | 378/53 |
| 6,087,656 A | 7/2000 | Kimmich et al. | |
| 6,134,293 A | 10/2000 | Guendel | |
| 6,342,698 B1 | 1/2002 | Stark | |
| 6,525,320 B1 | 2/2003 | Juni | |
| 6,525,321 B2 | 2/2003 | Juni | |
| D474,277 S | 5/2003 | Juni | |
| 6,757,423 B1 | 6/2004 | Amini | |
| D492,998 S | 7/2004 | Juni | |
| 7,012,257 B2 | 3/2006 | Juni | |
| 7,015,476 B2 | 3/2006 | Juni | |
| 7,071,473 B2 | 7/2006 | Juni | |
| 7,105,825 B2 | 9/2006 | Juni | |
| 7,158,661 B2 | 1/2007 | Inoue | |
| 7,339,174 B1 | 3/2008 | Hugg et al. | |
| 7,346,381 B2 | 3/2008 | Okerlund et al. | |

(Continued)

FOREIGN PATENT DOCUMENTS

WO    WO 02/099459 A1 * 12/2002

OTHER PUBLICATIONS

International Search Report dated Jun. 26, 2006.

*Primary Examiner*—David P Porta
*Assistant Examiner*—Shun Lee
(74) *Attorney, Agent, or Firm*—Pearne & Gordon LLP (57) ABSTRACT

A method and apparatus for correcting the output of sensors of a radiation detector by tracking a baseline value detected by the detector during quiescent operation, calculating an average to reduce noise, and storing the average as an offset value for correcting forthcoming data to eliminate the offset.

1 Claim, 6 Drawing Sheets

U.S. PATENT DOCUMENTS

2002/0163996 A1 11/2002 Kerrien et al.
2003/0057375 A1 3/2003 Williams et al.
2003/0136912 A1 7/2003 Juni

* cited by examiner

METHOD FOR TRACKING AND CORRECTING THE BASELINE OF A RADIATION DETECTOR

CROSS-REFERENCES TO RELATED APPLICATIONS

This application claims the benefit of provisional patent application Ser. Nos. 60/575,163, and 60/575,683, both filed on May 28, 2004, which are incorporated herein by reference.

BACKGROUND OF THE INVENTION

This application relates generally to a device and method for tracking the baseline of a radiation detector. More specifically, this application relates to a method which more accurately corrects a medical imaging gamma detector for baseline drift.

In the field of Medical Imaging, one modality is nuclear medicine (gamma camera) imaging. This imaging is known to use a detector consisting of a scintillator backed by a plurality of either single anode photomultiplier tubes (PMTs) or multi-anode position sensitive PMTs (PSPMTs) with appropriate electronics. For brevity in the upcoming discussion, PMTs and/or PSPMTs will be referred to as PMTs, but anyone skilled in the art will recognize that either can be used with appropriate modifications.

In its application, a patient is given a radioisotope either by injection or ingestion and then the detector(s), after being placed in close proximity to the patient, can determine where the radioisotope goes or has gone. Then, the device is used to detect the radioisotope as it travels through the patient.

The process of detection is when the radioisotope emits a gamma photon in the direction of the detector; it is absorbed by the scintillator. The scintillator emits a flash of light (a scintilla) which is detected by the plurality of PMTs. The PMTs closer to the flash have a higher signal than those further away. By measuring the intensity of the flash at each PMT, then using a centroid type calculation, a fairly accurate estimation of where the flash occurred is possible. The output of the PMT's is an electrical current proportional to the amount of light detected by each PMT. The PMT output current is converted to a voltage and amplified, then integrated to derive the total energy (light) detected by each PMT. The integration of the PMT output is started by detecting the presence of output current from the PMT, this is referred to as the trigger.

In order for the integrated PMT output to accurately represent the energy of the light detected by the PMT, the baseline of the PMT output must be accounted for. Ideally the baseline is zero, however this is rarely the case. The PMT baseline varies from the ideal due to offset voltages in analog electronics and crystal afterglow in high count rate situations. The offset of the baseline can therefore vary depending on such factors as temperature, power supply and count rate. It is therefore desirable to track the current baseline level on a continuous basis. This baseline value is then used to compensate the integrated PMT output result in some fashion, usually by subtracting the baseline error contribution from the integrated results, or by adjusting the actual baseline. If the baseline is not corrected, the effect is to shift the energy measured by the system, i.e., a shift in the energy peak is observed. Because high quality imaging requires a stable energy peak, drifting baselines can cause a general degradation in image quality.

The traditional baseline tracking technique comprised taking a sample of the PMT output channel when the trigger detection circuit determined that there had been no gamma photon interaction for a period of time long enough so that the PMT output should be in its quiescent state, or that the PMT channel baseline being sampled is not effected by the current gamma photon interaction because it is spatially separated from the gamma photon interaction.

This technique is flawed because it relies principally on the trigger detection circuit to determine PMT output inactivity. There is always the possibility that the PMT output is not at its quiescent state due to noise, or low energy gamma photon interactions that are not detected by the trigger detection circuit. In order to circumvent this problem, the prior art used multiple baseline samples that were either averaged or their weighted mean tracked with a histogram to determine the baseline value. The disadvantage of using multiple baseline samples to arrive at a calculated baseline value is the time required to gather the samples and calculate the representative baseline. Because crystal afterglow is a phenomenon that varies in the millisecond time constant range, in order to track crystal afterglow when the gamma photon source is changing rapidly in either intensity or spatial position would require baseline updates on the order of thousands of time a second. Thus, a means of correcting one or more the above identified shortcomings would be useful.

SUMMARY OF THE INVENTION

Provided is a method for determining an offset value that corrects for baseline drift in a radiation detector including a radiation sensor having an output, the method comprising the steps of:

gathering a plurality of samples of the sensor output in a quiescent state;

generating an offset value from the average of the plurality of samples;

subtracting the offset value from forthcoming acquired data of the sensor to get an accurate measure of the sensor output; and performing the gathering, generating, and subtracting steps periodically, intermittently or continuously during operation of the detector to compensate for the baseline drift in the offset value of the detector.

Also provided is method for determining an offset value that corrects for baseline drift in a radiation detector including a radiation sensor having an output, the method comprising the steps of:

determining a reference value by averaging a plurality of samples of the sensor output;

determining a baseline value by averaging another plurality of samples of the sensor output;

calculating whether the baseline value falls outside of an acceptable interval;

repeating the determining the baseline value and the calculating steps for a specified period of time or a predetermined number of iterations;

determining if an event trigger has occurred;

replacing the offset value with the reference value after the repeating step has completed without an event trigger occurring and without the baseline value falling outside of the acceptable interval; and repeating the method to continuously, periodically, or intermittently update the offset value.

Further provided is a method for determining an offset value that corrects for baseline drift in a radiation detector including a radiation sensor having an output, the method comprising the steps of:

gathering a plurality of samples of the sensor output spaced apart by a specified time interval;

determining if an event trigger occurred during the gathering;

compensating for noise in the samples;

determining if the samples are stable;

rejecting the gathered samples and restarting the gathering step if it was determined that an event trigger occurred or one or more of the samples were determined not stable; and utilizing some number of unrejected samples to determine the offset value.

Still further provided is a method for determining an offset value for correcting baseline drift in a radiation detector including a photomultiplier tube (PMT) having an output, the method comprising the steps of:

(1) collecting a plurality of samples of the PMT output;
(2) averaging the samples to determine a reference value;
(3) collecting a plurality of additional samples of the PMT output;
(4) averaging the additional samples to establish a baseline value;
(5) calculating if the baseline value falls outside an interval based on the reference value;
(6) repeating steps (3)-(5) a specified number of iterations or until a specified time has elapsed to establish a plurality of the baseline values;
(7) monitoring for an event trigger occurring;
(8) storing the reference value as the offset value only if no event trigger occurred during steps (1)-(6) and only if none the plurality of baseline values fell outside the interval; and
(9) repeating steps (1)-(8) during the operation of the radiation detector.

Also provided is a radiation detector comprising:

a radiation sensor;

means for gathering a plurality of samples of the sensor output spaced apart by a specified time interval;

means for determining if an event trigger occurred during the gathering;

means for compensating for noise in the samples;

means for determining if the samples are stable;

means for rejecting the gathered samples and restarting the gathering if it was determined that an event trigger occurred or one or more of the samples were determined not stable; and means for utilizing some number of the samples to determine the offset value.

And further provided is a radiation detector comprising:

a radiation sensor for outputting a value of detected radiation;

an integrator for integrating the outputted value during an event;

an offset register for storing and outputting a current offset value;

a subtractor for subtracting the offset register output from the sensor output;

an averaging circuit for calculating and outputting an average of a plurality of samples of the sensor output;

a baseline register for storing an output of the averaging circuit a holding circuit for storing and outputting a delayed value of the baseline register output;

an absolute difference generator for determining and outputting the absolute difference between the baseline register output and the holding circuit output;

a delta window register for storing and outputting a window value; and a comparator for inputting the outputted absolute difference, and for outputting an out-of-window signal if the absolute difference is larger than the window value.

The offset register of the detector is intermittently, periodically, or continuously updated with the value of the reference register output only if there was no out-of-window signal and the integrator did not integrate the outputted value during a specified time interval.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE PREFERRED EMBODIMENTS

Provided is a device and method which allows a radiation detector to accurately correct for baseline drift by tracking the baseline value during detector operation and compensating the detector output for the baseline value.

In particular, provided is a method that uses a different approach for baseline tracking than in prior art. The present invention tracks the baseline by using the fact that, when the output of a radiation sensor (such as a photomultiplier tube (PMT), for example) is at its quiescent value, the output will typically be stable for a considerable period of time.

The disclosed process of baseline tracking can be implemented with digital methods, and thus the response time can be made rapid enough to track and remove crystal afterglow in high-count situations.

To implement the offset search method of the invention, the sensor output can, if desired, be converted to a digital value with an A/D converter (or a digital sensor utilized). A current offset value is subtracted from the sensor output value to remove any DC offset from the integration results. The DC offset value is determined using an "offset search operation" for searching the sensor output value for a stable baseline.

Three factors are used for determining if the baseline is stable. These factors are 1) sensor output value, 2) time and 3) event triggers. The baseline is considered stable if the sensor output value remains (1) within a given selected range; (2) for a selected period of time; and (3) no event triggers are detected by the global trigger system during that time (ensuring that the sensor was in a quiescent state for the samples). The sensor output range and time period are variable, and may be taken from predetermined values, or could be calculated in real or near-real time based on some criteria. These values are then selected by the system control processor for implementation in the method.

When the baseline is considered stable, a new baseline value is saved for use in correcting the sensor output. This offset search operation method can be executed continuously, periodically (on a regular basis), or intermittently (on an as-needed basis, for example, that may not be periodic), thereby regularly updating the offset register with the current offset value and thus keeping this value accurate. Further, the averaging of a number of sampled values is used to smooth out noise and other slight variations, further ensuring an accurate baseline determination.

No intervention on the part of the user is typically necessary, as the correction disclosed herein can be run automatically and continuously using an automated system as described hereinbelow.

Figure 1:
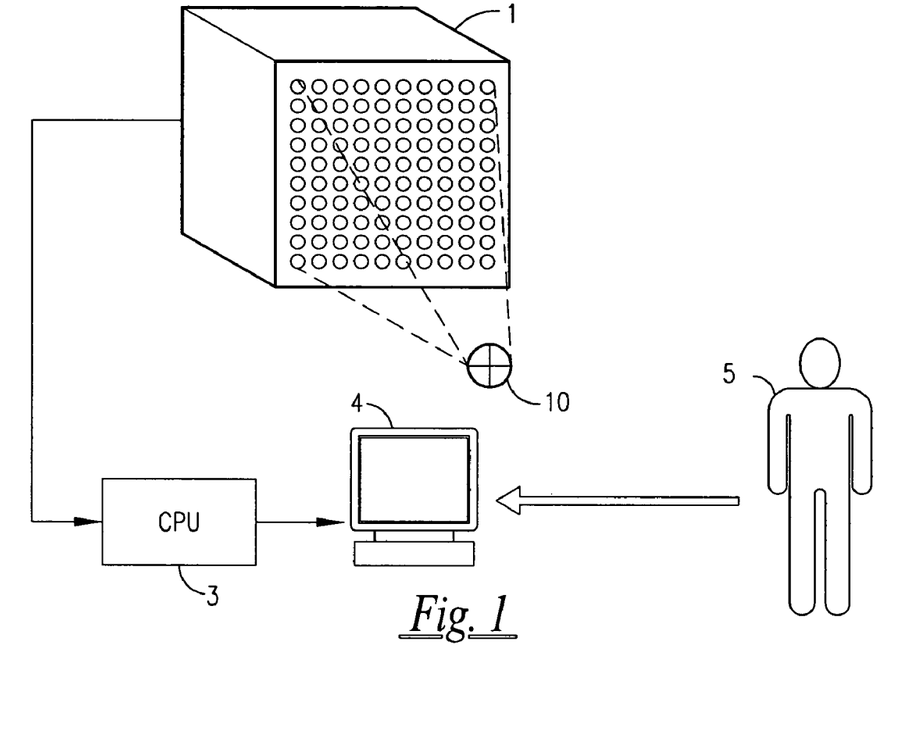
FIG. 1 is a diagram showing one potential radiation detector setup.

FIG. 1 is a block diagram showing a radiation detector in the context of one potential use of the detector. FIG. 1 shows a radiation detector 1, connected to a processor 3, which is connected to a Graphical User Interface (GUI) 4 for displaying information to a technician/operator 5.

The detector 1 includes a plurality of photo-multiplier tubes (PMTs) for detecting scintilla generated by a scintillation crystal which has absorbed gamma rays (photons) radiated from a radiation source 10.

Figure 2:
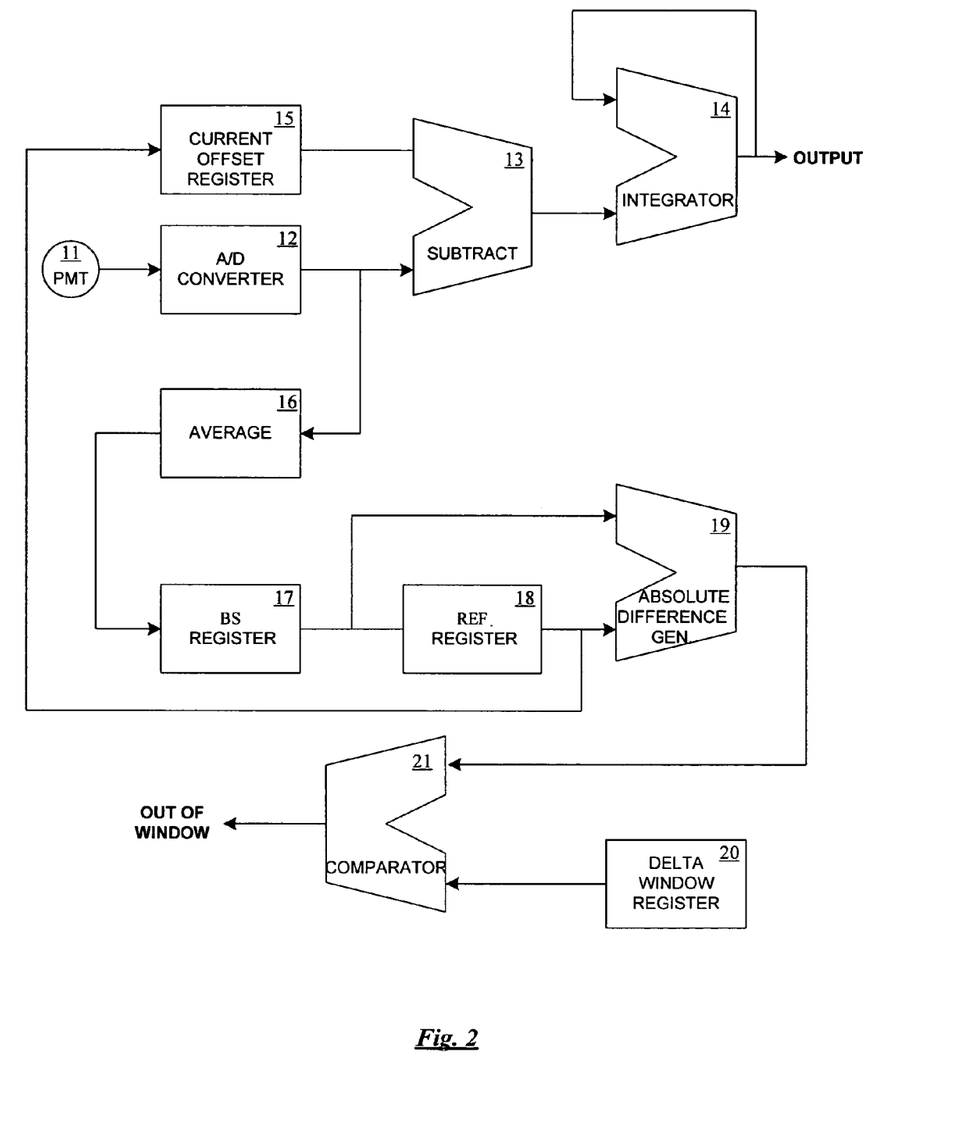
FIG. 2 shows a block diagram of the baseline tracking hardware for an example embodiment.

FIG. 2 shows a block diagram of an apparatus of an example embodiment for performing the offset baseline determination method for a current embodiment of the invention. An analog PMT output 11 is converted to a digital representation by being input to an analog-to-digital (A/D) converter 12. Alternatively, an A/D converter may not be necessary if the PMT is capable of outputting a digital value. The A/D converter output of the current embodiment is rated at 40 MHz and is free-running and set to sample every 25 nanoseconds.

Alternative embodiments using different sampling periods can also be utilized, if desired. Or the sampling periods could be made variable and selectable by a processor. Generally the higher the sample rate the better the accuracy of the sampled signal. However, because baseline variation is a relatively slowly changing phenomena, higher sample rates typically do not significantly improve the results.

The 40 MHz rate is used in the current embodiment because it is the rate used by the A/D converter 12 used to sample the PMT output to determine the PMT signal energy during event integration. Thus, the choice of 40 MHz simplifies the method, because, for the sake of economy, the same A/D converter is used to sample the output values for determining the offsets.

Furthermore, the circuit of FIG. 2 (and/or the method of the invention) could be utilized for other sensors that operate in a similar manner as the PMT, i.e., those sensor that have an output that is typically be stable for a considerable period of time, but has baseline drift effects.

In the current embodiment, every 16 A/D samples are averaged together by the average logic device 16, to make one baseline value. Alternative embodiments averaging different numbers of samples or variable numbers of samples selectable by the processor can also be utilized, if desired.

A 16 sample average was chosen for the current embodiment because it has been shown to combine an adequate number of samples to average out spurious noise. Furthermore, a digital result can easily be divided by 16 merely by shifting the result 4 places to the right in binary logic, thus simplifying the averaging step. The number of samples to be averaged should include a sufficient number of samples to smooth out random noise that may be present in the individual samples.

During the baseline determination steps, the current baseline value (BS) is stored in the Baseline Register 17, based on an average of 16 sample digital outputs of the PMT. As discussed above, this averaging process is used to smooth over noise variations, and thus the sampling period and the number of samples averaged might be adjusted for different noise environments for optimum operation and accuracy, if desired. Using the values defined above for the current embodiment, one baseline value represents 400 ns (16*25 ns) of averaged PMT output samples.

At the start of the baseline search operation of the current embodiment, a reference baseline value, derived from the average of an initial 16 PMT digital output samples, is saved in the REF Register 18, for comparison to subsequently determined baseline values (BS). Each subsequently determined baseline value is then sequentially stored in the BS Register 17, and compared to the reference value stored in the REF Register 18 by the Absolute Difference Generator 19.

If any of these subsequent baseline values (BS) are different from the reference value (REF) by greater or less than a selected window range (interval) stored in the Delta Window Register 20, the Comparator 21 will generate an out of window signal that terminates the current baseline search operation and rejects the reference baseline value (REF), and the process then restarts. If no out of window signal is generated, the reference baseline value (REF) stored in the REF Register 18, is then stored in the Current Offset Register 15 for use in correcting the PMT 10 output values by subtracting the current offset value from the PMT output (using the subtract logic device 13).

The values chosen for the window range are based on allowing an acceptable rate of baseline updates (see graph of FIG. 4) while keeping the energy resolution as stable as possible. The larger the window interval, the greater the frequency of baseline updates. However, too large a window causes the baseline correction value to jump around, thereby reducing energy resolution. Likewise, the larger the offset track time value (which determines the number of determined BS values used before updating the offset value with the REF value), the lower the baseline update rate. The values for these variables are chosen based on what works best for a particular detector design.

The absolute difference generator 19 and comparator 21 are used to determine if the output is, for any reason, unstable, allowing the results to be rejected, because those results are likely erroneous. The instability can be caused by the PMT detecting light from a scintillation, background event, or excessive noise, for example. When it is determined that the PMT output is unstable, that sample should not be utilized to represent the baseline, so the current REF value is rejected and the process is started over.

The reference value is considered accurate and stable when the baseline search operation has compared the required number of baseline values (BS) with the reference baseline value (REF) determined at the start of each search operation, and all subsequent baseline values (BS) are found to be within the selected delta window range (in the window interval). In the current embodiment, the baseline reference value (REF) contained in the REF Register 18, is then loaded into the Current Offset Register 15, and thus becomes the updated baseline value. The baseline value is subtracted from the PMT samples 13 to remove the contribution of the baseline from the integrated PMT output 14.

The reason for using integrated PMT samples is that the normal operation of the radiation detector is to determine the energy of the radiation event. This is accomplished by measuring the total light emitted by the scintillation of the crystal. To measure the total light emitted, the PMT output must be integrated (to obtain the area under the curve, where the curve is the exponential pulse from the PMT).

Figure 3:
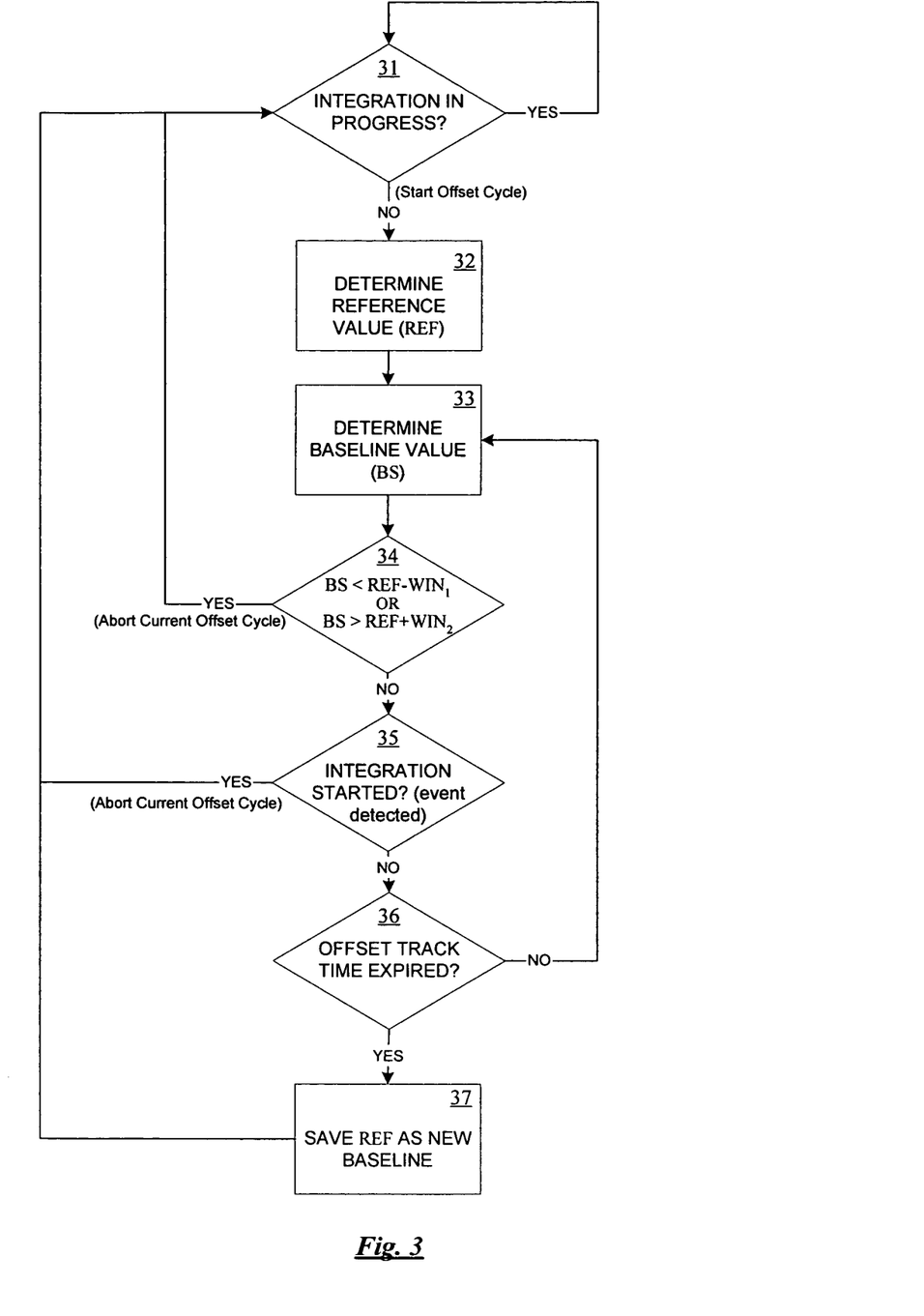
FIG. 3 is a flow chart of the baseline tracking method according to the example embodiment.

FIG. 3 is a flow chart demonstrating the operation of the baseline search algorithm according to the example embodiment. Baseline search operations are preferably executed whenever the trigger logic does not detect any gamma photon interactions. First, it is determined whether the integration is in progress (step 31). If an integration is in process, then the trigger circuit has determined that an event has probably occurred, and therefore the PMT outputs would not be in their quiescent state.

If no integration is in process, the Offset Cycle can begin. The current baseline value (REF) is determined and saved in the Holding Register (step 32). A subsequent baseline value (BS) are then determined (step 33) and compared to the reference value (REF) (step 34). If the subsequent baseline value (BS) is different from the reference value (REF) such that it falls outside an acceptable selected window interval (at step 34), the baseline (or reference) value is probably unstable, and the current baseline search operation is aborted (returns to step 31), where it is again determined if an integration is in progress (step 31), and if not, a new baseline search operation offset cycle is then begun with a new reference value (at step 32). Note that the upper limit of the window interval ($WIN_1$) may be the same as, or different from, the lower limit of the window interval ($WIN_2$), as desired. In the current embodiment, both the upper and the lower limits are identical so that only one window value need be stored.

Figure 4:
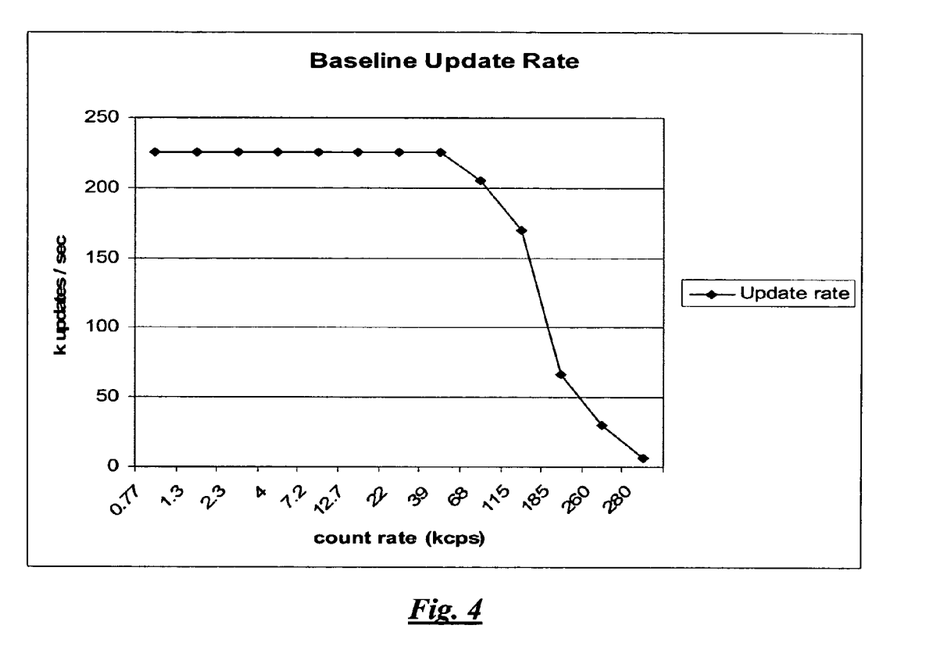
FIG. 4 shows a graph of baseline update frequency vs. count rate.

The current embodiment uses an upper and lower window value between 1 and 8. A value of 1 appears to give a better energy resolution and acceptable update rates, and thus is a preferred value. FIG. 4 data was taken with window value of 1.

When the baseline value passes the window interval test (at step 34) and thus falls within the interval, the process checks to see if an integration has started (step 35). If an integration has started, this likely shows that an event has occurred that triggered the integration, and the current baseline search operation is aborted (returns to step 31). But if no integration has started (at step 35), the process continues.

Only when the baseline search operation has executed for the selected offset track time interval (step 36) without being aborted by a window violation or event trigger is the current offset register (FIG. 2, item 15) loaded with the updated reference value (REF) (step 37) stored in the REF Register (FIG. 2, item 18). Thus, the reference value (REF) becomes the new baseline value, for use in correcting the radiation detector output, and the algorithm executes again at step 31 to continue updating the baseline drift.

In the current embodiment, the number of baseline values examined to determine if the baseline is stable enough to be used as the baseline correction value is determined by the offset track time setting. The offset track time defines the amount of time (and thus the number of process cycles) that the sensor output must be stable (within the window) for the current reference (REF) value to be saved and used as the new baseline offset value. The value of offset track time can be set by a detector computer, and its value might change depending on the operating specification of the detector, if desired.

For example, the higher the count rate, the less average time the baseline would be stable between events. In that case, a shorter offset track time might be preferred. In use, the offset track time may be dynamically adjusted by the computer depending on the detected count rate. However, the shorter the offset track time, the more baseline updates per second typically required. The offset track time can therefore be made variable. For the current embodiment, a value of 1600 ns is used for the offset track time (i.e., 4 consecutive 16 sample averaged baseline values must remain within the window value setting to establish a new baseline [25 ns/sample× 16 samples=400 ns; 400 ns×4 cycles=1600 ns]).

As discussed above, an event trigger will abort the offset search process because, if a trigger is detected by the trigger circuit, an integration will be started, and integration is one of the terminating conditions of the baseline search (see steps 31 and 35). However, the invention does not exclusively depend on the trigger detection circuit to reject baseline values; instead, the stability of the baseline itself is also used as the determination of the quiescent state of the PMT. This reduces problems of sampling the baseline when the PMT output is not stable, but the instability was not significant enough to be detected by the trigger circuit, for example. Hence, whenever the offset search cycle starts, a REF value is determined. If the offset search operation is aborted for any of the above reasons, the REF value is discarded and a new REF value is taken when the offset cycle restarts.

Figure 3A:
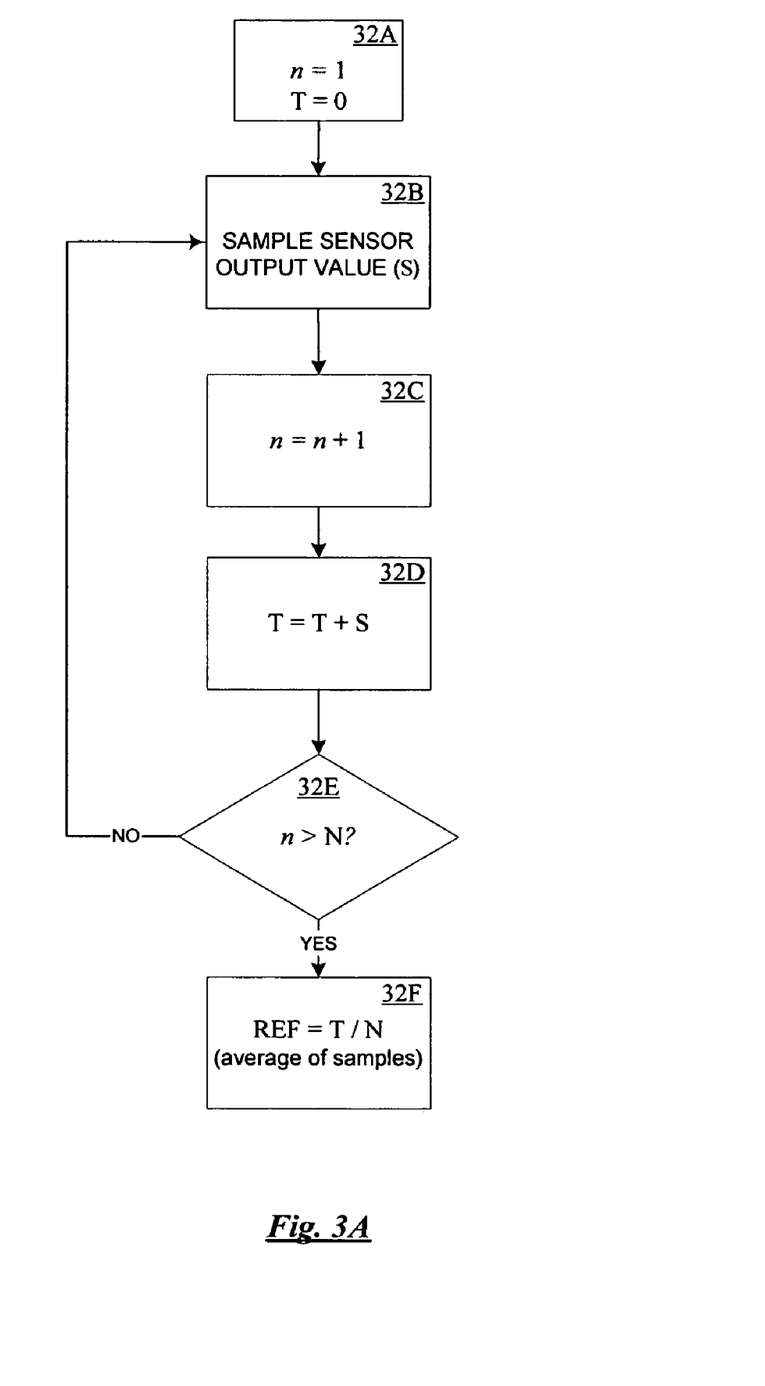
FIG. 3A is another flow chart showing a reference value determination process.

FIG. 3A shows flow chart providing more detail about the reference value determination step 32. First, a count (n) and summation values (T) are initialized (step 32A). A sample sensor output is taken (step 32B), the count is incremented (step 32C), and the new samples (S) are added to the running total of the sample values (T) (step 32D), until the desired number of samples (N) are taken (step 32E). Then, the samples are averaged together (step 32F), leading to the reference value (REF) of the current cycle.

Figure 3B:
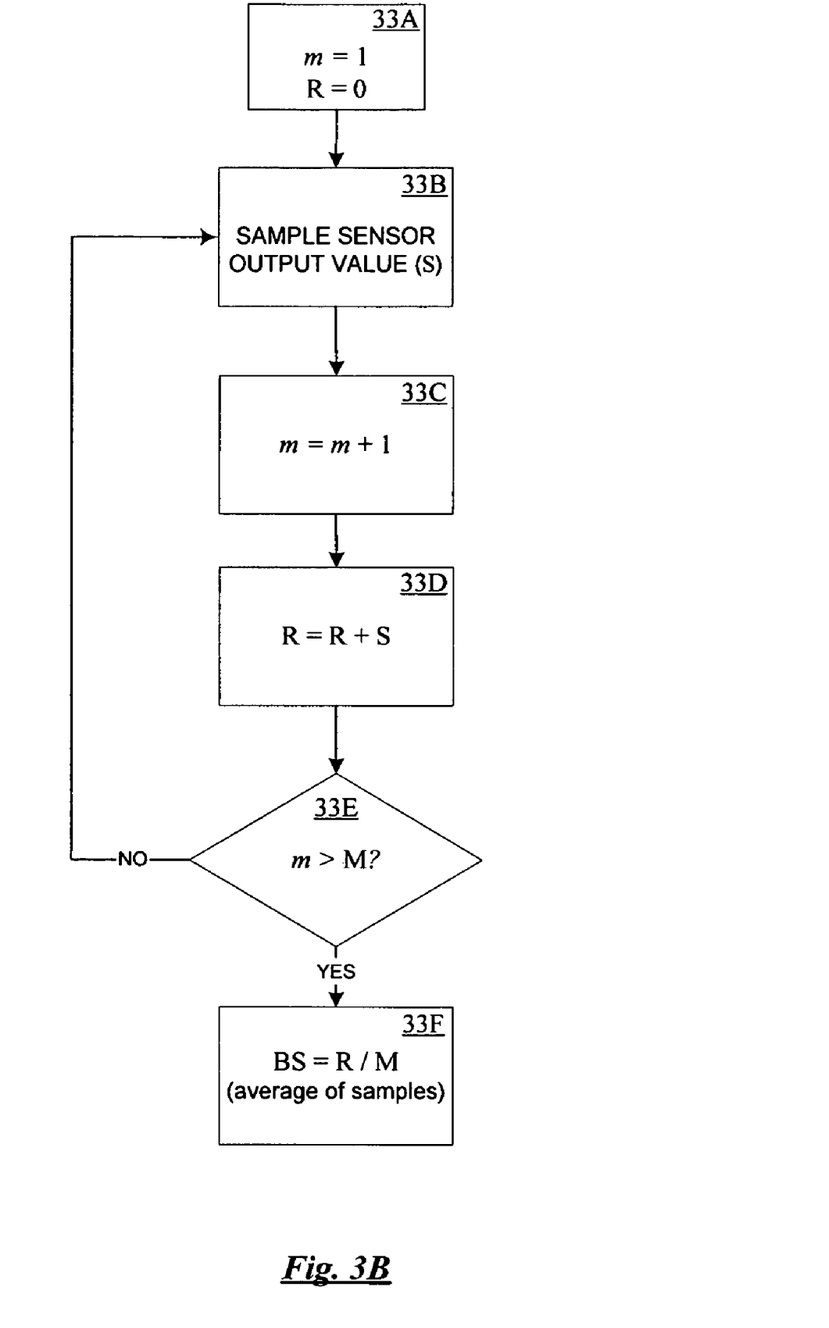
FIG. 3B is another flow chart showing a baseline value determination process.

FIG. 3B shows a flow chart similar to the one for FIG. 3A, for the process of determining the various baseline values (BS) of step 33. First, a count (m) and summation values (R) are initialized (step 33A). A sample sensor output is taken (step 33B), the count is incremented (step 33C), and the new samples (S) are added to the running total of the samples (R) (step 33D), until the desired number of samples (M) are taken (step 33E). Then, the values are averaged together (step 33F), leading to the baseline value (BS) of the current cycle.

Note that for any of the above routines, the step orders might be re-arranged without necessarily changing the results. Further, the values for N and M are chosen as discussed above, and for the current embodiment, are both chosen to be 16.

Furthermore, note that a simplified process might just utilize the various average baseline values (BS) as the offset, as long as it is determined that those values are in their quiescent state.

Figure 5:
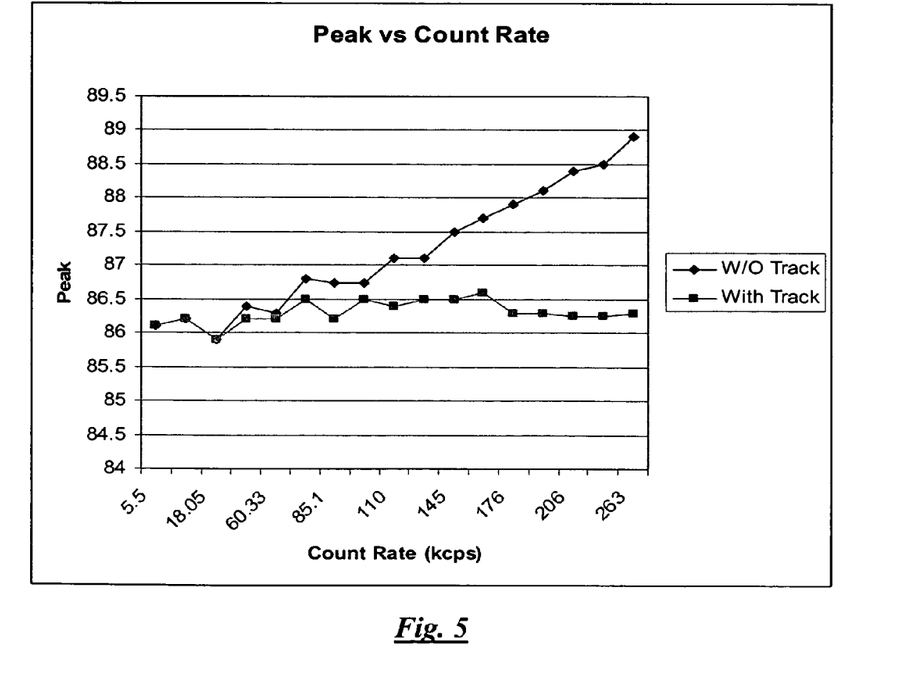
FIG. 5 is a graph showing the performance of the baseline tracking method.

FIG. 5 shows a graph of the energy peak shift with and without baseline tracking (labeled "with track" and "W/O track", respectively). This plot clearly shows the effects of baseline shift at increasing count rates, and the effectiveness of the baseline tracking method to compensate for the shift.

FIG. 4 shows the number of baseline updates per second for increasing count rates. An upper and lower window value of 4 was used for this plot. This graph shows that even at high count rates, the baseline correction update rate is great enough to almost instantly compensate for sudden baseline shifts. This capability thus enhances image quality in studies when the count rate changes rapidly, such as in first-pass cardiac imaging applications.

Furthermore, because one of the requirements of high quality gamma camera imaging is good calibration of the detector (s) for accurate detection of the gamma photons, the calibration method disclosed in application Ser. No. 11/101,673, filed on Apr. 8, 2005, and incorporated herein by reference, might also be useful in tandem with the baseline tracking and correcting method disclosed herein.

Finally, because uniformity calibration and correction can also be useful in tandem with the invention, co-pending utility patent application Ser. No. 11/140,336, filed on the filing date of this application, is also incorporated by reference.

The invention has been described hereinabove using specific examples and implementations; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

What is claimed is:

1. A radiation detector comprising:
   a radiation sensor for outputting a value of detected radiation;
   an integrator for integrating said outputted value during an event;
   an offset register for storing and outputting a current offset value;
   a subtractor for subtracting said offset register output from said sensor output;
   an averaging circuit for calculating and outputting an average of a plurality of samples of said sensor output;
   a baseline register for storing an output of said averaging circuit
   a holding circuit for storing and outputting a delayed value of said baseline register output;
   an absolute difference generator for determining and outputting the absolute difference between said baseline register output and said holding circuit output;
   a delta window register for storing and outputting a window value; and
   a comparator for inputting said outputted absolute difference, and for outputting an out-of-window signal if the absolute difference is larger than said window value, wherein
   the detector is adapted such that said offset register is intermittently, periodically, or continuously updated with the value of the holding circuit output only if there was no out-of-window signal and said integrator did not integrate said outputted value during a specified time interval.

* * * * *